United States Patent [19]

Eguchi et al.

[11] Patent Number: 4,926,207

[45] Date of Patent: May 15, 1990

[54] POSITIONING AND STRUCTURE OF CIRCUIT ELEMENTS IN A CAMERA

[75] Inventors: Masaharu Eguchi; Akira Yamada, both of Tokyo, Japan

[73] Assignee: Canon Kabushiki Kaisha, Tokyo, Japan

[21] Appl. No.: 414,721

[22] Filed: Sep. 29, 1989

Related U.S. Application Data

[63] Continuation of Ser. No. 913,600, Sep. 29, 1986, abandoned, which is a continuation of Ser. No. 648,702, Sep. 7, 1984, abandoned.

[30] Foreign Application Priority Data

Sep. 9, 1983 [JP] Japan .................. 58-139811[U]
Oct. 20, 1983 [JP] Japan .................. 58-162353[U]

[51] Int. Cl.$^5$ .................. G03B 7/26; G03B 15/05; G03B 17/02
[52] U.S. Cl. .................. 354/484; 354/485; 354/82; 354/288

[58] Field of Search .............. 354/293, 269, 484, 485, 354/82, 288

[56] References Cited

U.S. PATENT DOCUMENTS

| | | | |
|---|---|---|---|
| 4,227,788 | 10/1980 | Shimizu et al. ...................... | 354/485 |
| 4,427,281 | 1/1984 | Yamada ............................... | 354/219 |
| 4,441,801 | 4/1984 | Mashimo et al. .................. | 354/293 X |
| 4,482,229 | 11/1984 | Sugiura ........................... | 354/288 X |
| 4,510,419 | 4/1985 | Takematsu ....................... | 354/145.1 |

*Primary Examiner*—Michael L. Gellner
*Attorney, Agent, or Firm*—Toren, McGeady & Associates

[57] ABSTRACT

In the disclosed arrangement circuit elements of a camera are structured and positioned within a camera grip which protrudes from a front portion of a camera body, thereby reducing the size of a camera body. In one embodiment a DC/DC converter and a remote terminal are positioned within the camera grip when such are used in a camera.

16 Claims, 7 Drawing Sheets

POSITIONING AND STRUCTURE OF CIRCUIT ELEMENTS IN A CAMERA

This is a continuation application Ser. No. 06/913,600, filed Sept. 29, 1986, which in turn is a continuation application Ser. No. 06/648,702, filed Sept. 7, 1984, both abandoned.

BACKGROUND OF THE INVENTION:

Field of the Invention:

The present invention relates to the positioning and structure of circuit elements in a camera.

Description of the Prior Art:

Recent electonization of cameras has made it necessary to build various circuit elements, and a battery or batteries of relatively large size for energizing the circuit elements, into the camera along with the usual mechanical elements. One proposed structure shown, for example, in U.S. Pat. No. 4,427,281, positions a battery or batteries, for example, a cylindrical type UV-3 (No. 3) battery, alongside the spool cavity of a camera body and positions various circuit elements within the pentagonal portion of a single lens reflex camera. However, there are cases in which the pentagonal portion of a single lens reflex camera cannot house circuit elements, and in which it is necessary to place the circuit elements in locations other than the pentagonal portion, due to the special conditions of the circuit elements. Housing of the circuit elements in locations other than the pentagonal portion leads to an increase in the size of the camera, which constitutes an undesirable problem.

In a camera having no pentagonal portion, such as a lens shutter camera, housing of various circuit elements results in an increase in the size of the camera.

Among the various camera circuit elements, the DC/DC converter and a remote terminal create special concerns.

In recent automatic cameras, particularly a single lens reflex camera with an automatic wind-up mechanism built therein, four batteries of the UV-3 or UV-4 type have been used as a power source. In order to make the camera as compact as possible, it has been very much desired that such a single lens reflex camera have a built in automatic wind-up mechanism that uses only two batteries of the UV-3 type to drive the motor. However, in this case, the ratio of variation in the voltage of the batteries while driving the motor is relatively large and it is necessary always to supply a constant voltage to a control circuit for stabilizing the drive and control of the camera. Also, a relatively high voltage power source, as tens of volts, is needed when an automatic focusing mechanism is provided in the camera. Thus, a DC/DC converter has to be built into the camera in order to boost a power source battery voltage or to provide a constant voltage.

From the stand-point of the internal structure of a camera, there has been an increase in the congestion of the internal space of the camera by factors such as housing of an automatic wind-up and rewinding mechanism, or an automatic focusing mechanism with built in batteries, etc. The mounting of a DC/DC converter creates an added undesirable problem for the external design of the camera as its size increases.

Also, in a DC/DC converter the oscillating output of a transister oscillator, etc., using direct current is boosted by a transformer and then returned again to direct current. Therefore, the mounting of such a converter creates various electrical difficulties. For example, a ripple and spike current is generated at a power line of the DC/DC converter in synchronism with an oscillating cycle of the DC/DC converter. This results in erroneous operations in control IC's in the camera using such a power source. Moreover, the DC/DC converter itself generates inductive noises which may adversely affect the light measuring circuit.

Additionally, the introduction of cameras, particularly single lens reflex cameras, with built in automatic wind-up mechanisms allowing remote photo-taking or un-manned photo-taking has made it necessary to provide a remote terminal. Heretofore the remote terminal was provided at the film wind-up mechanism or motor drive mechanism, mounted on the outside of the camera. In order to have a built in automatic wind-up mechanism, a remote terminal was provided in conventional cases at the front or side plane on the cartridge side of the camera. This facilitates the provision of an extra internal space in the camera but does not hinder the ordinary holding of the camera, in view of the fact that congestion of the internal space of the camera increases as a motor or the housing of UV-3 or UV-4 type batteries in place of small sized silver or lithium batteries are added.

Figure 1:
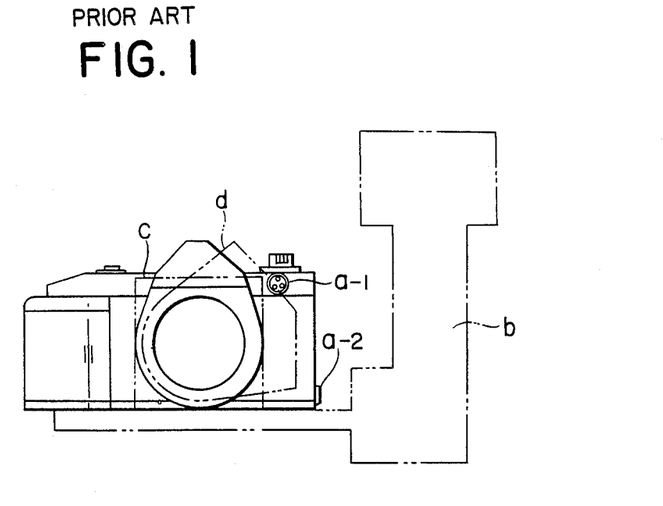
FIG. 1 is a front elevation showing an example of a camera having a conventional remote terminals.

FIG. 1 exemplifies a camera having a conventional remote terminal, wherein a-1 and a-2 are remote terminals provided respectively at the front plane on the patrone side and at a side plane on the same side. However, in the positioning shown in FIG. 1, when components of a single lens reflex camera, for example, a grip type stroboscope "b", a bellows "c", an external range-finding type auto-focus lens "d", etc. shown by imaginary lines in FIG. 1, are mounted on the camera, the attaching or detaching of a remote jack becomes inconvenient or impossible. This adversely affects handling and introduces a problem with respect to interchangeability in a camera system.

SUMMARY OF THE INVENTION

A first object of the present invention is to provide the positioning and structure of circuit elements of a camera in the space of a grip which protrudes from the front portion of a camera body, thus reducing the camera size.

A second object of the present invention is to provide the positioning and structure of circuit elements of a camera so that when a DC/DC converter is used as one of the circuit elements, the efficiency of the DC/DC converter is enhanced and generation of electrical troubles is prevented.

A third object of the present invention is to provide the positioning and structure of circuit elements of a camera so that when a remote terminal is used as one of the circuit elements interchangeability in the camera system is not impaired.

Further objects of the present invention will become apparent from the following detailed description of preferred embodiments thereof.

DETAILED DESCRIPTION OF THE PREFERRED EMBODIMENTS

Various embodiments of the present invention will be described with reference to the accompanying drawings.

FIG. 2 to FIG. 6 show a first embodiment of the present invention.

In these drawings, 1 is a camera body made of die-cast metal, 1' is a front bulged portion thereof, 2 is a remote terminal for connecting an electric wire for a remote control, 3 is a grip spacer which covers up the bulged portion 1' of the body and forms a grip portion to facilitate the holding of a camera by a photographer, 4 is a grip rubber attached to grip spacer 3, and 5 is a DC/DC converter, wherein these components are fixed to the camera body by bolts shown in the drawing. Element 6 is a remote jack, 7 is a back lid of the camera, 8 is a power source battery, and 8a and 8b are power source battery chambers formed in the camera body. Element 9 is a film take up spool housing a motor 9a therein and 10 is a film wind up sprocket, each having conventionally known arrangements and functions. Spool chamber 11 houses the spool 9 therein.

Figure 5:
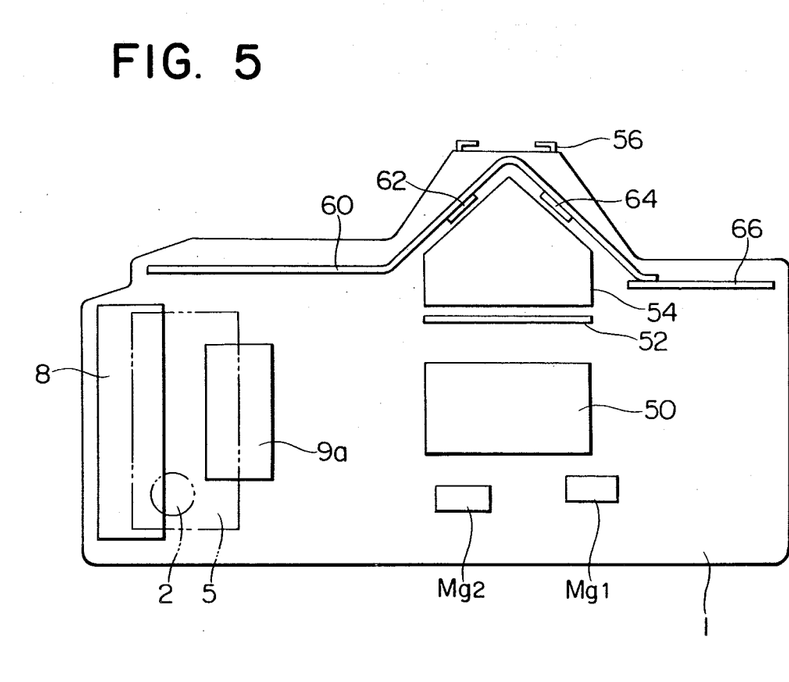
FIG. 5 is a front elevation showing an internal lay-out of the single lens reflex camera shown in FIG. 2.
Figure 6:
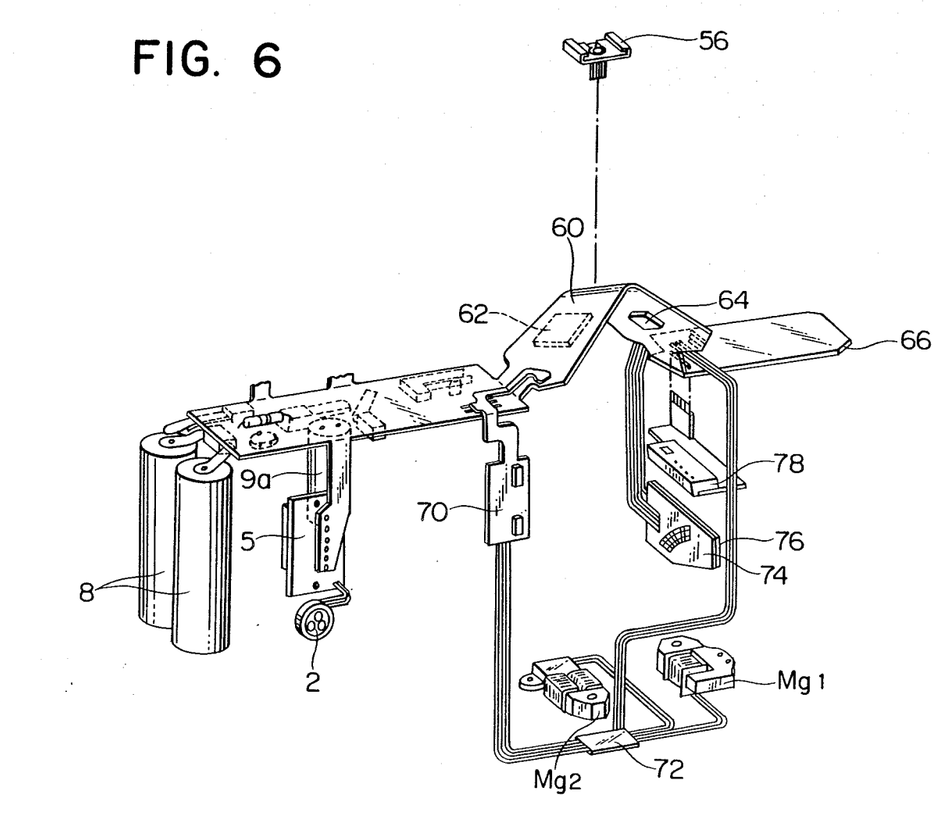
FIG. 6 is an oblique view for an arrangement of each component showing an internal lay-out of the single lens reflex camera shown in FIG. 2.

Element 50 is a 45° mirror, 52 is a focus plate, 54 is a pentagonal prism and 56 is an accessory shoe. Also, 60 is a flexible printed circuit board on which main circuit elements for controlling operations of the camera are arranged. The board 60 is positioned along an upper cover of the camera, wherein CPU 62 and I/O interface LSI 64 are placed at positions over the pentagonal prism 54. Element 66 is a reinforcing printed circuit board. A flexible printed circuit board 70 for a shutter, an intermediate printed circuit board 72, an AE control magnet Mg1, a release magnet Mg2, a full open FNO input circuit board 74, an AE aperture information circuit board 76, and an LED display unit 78 are connected to the flexible printed circuit board 60 through lead wires, etc.

Figure 3:
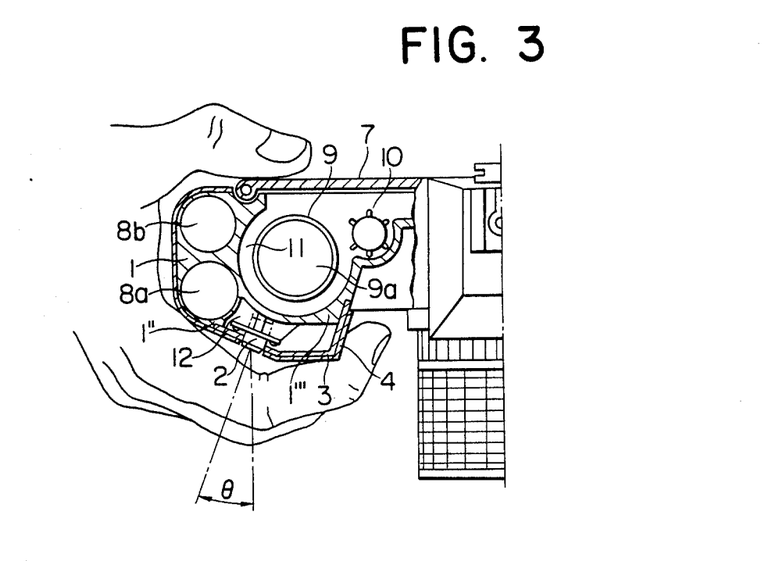
FIG. 3 is a cross-sectional view of an important portion in FIG. 2.

As shown in FIG. 3, the battery chambers 8a and 8b are for housing UV-3 type or UV-4 type batteries and are provided parallel to and in a neighboring manner to the spool chamber 11. A hinged part for the back lid 7 is provided between the battery chamber 8b at the back lid side and the spool chamber 11. The remote terminal 2 and the DC/DC converter 5 are attached to the camera body using bolts placed within a recess 12 formed between cylindrical plane shape walls 1'' and 1''' of the camera body forming the battery chamber 8a at the mount side and the spool chamber 11, and within a space provided at the inside of the camera by a projection of the grip spacer 3, which is a plate-shape rigid body bolted to the camera body.

As shown in FIG. 3, the remote terminal 2 is so attached that it is inclined by an angle $\theta$ toward the outside from the photographing optical axis. The direction in which the remote terminal 2 is attached is almost perpendicular to the outermost plane of the grip spacer 3. The grip rubber 4 is bonded in place to cover the grip spacer 3 and serves as a slip-preventing member when the camera is held by hand. The grip spacer 3 and the grip rubber 4 have holes perforated therein corresponding to a contacting part of the remote terminal 2 so that only the contact part of the remote terminal is exposed to the outside of the grip: A remote terminal cap (not shown) is placed over the contact part, except when the terminal is used for prevention of contamination of the contact point. For remote photo-taking, remote jack 6 connected to a remote electro-magnetic release, an interval timer, a radio controller, a lumi-controller, etc. is inserted into the remote terminal 2 so that remote photo-taking (un-manned photo-taking) can be done.

According to the present invention, battery chambers are provided adjacent and parallel to the spool chamber and the remote terminal is positioned in a space provided by a recess formed between cylindrical plane shape walls of both chambers as well as a space formed at the inside of the grip part. Therefore, the remote terminal can be housed within the grip part with a smaller protrusion than that required when the grip part protrudes outside as much as the space occupied by the remote terminal. Thus formation of an adequate grip shape and an effective utilization of a limited space within the camera is achieved. Also, as shown in FIG. 3, such an arrangement is made that the contact part of the remote terminal is exposed at a position which is a portion of an area ordinarily held by the right hand of a photographer but is out of the very portion being touched by his finger tips. Thus, holding of the grip part will not be impaired. Further, the fact that the remote terminal is provided at the grip part ordinarily covered by the right hand greatly reduces any difficulty which may take place concerning interchangeability with a single lens reflex camera already on the market. This is because the grip part held by the right hand will not be held by the right hand at the time of a remote photo-taking. Even if the remote jack is inserted into the remote terminal provided at the above position, no problem is created.

Figure 2:
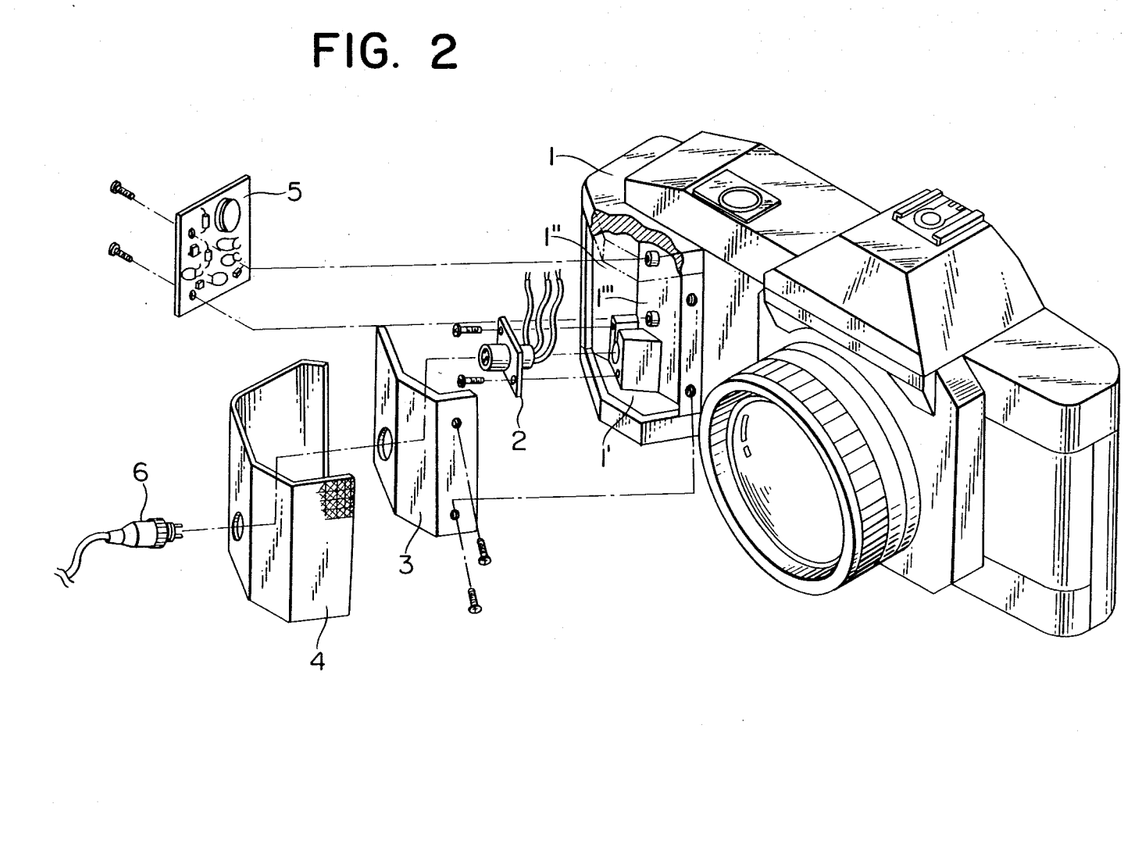
FIG. 2 is a partially exploded oblique view of a single lens reflex camera as a first embodiment of the present invention.

When a remote jack 6 of a so-called straight push-in type as shown in FIG. 2 is used, a camera mounted on a close-up photo-taking stand is pointed downwards and photo-taking is made, the entry of a remote wire into the picture may constitute a problem. However, compared to a case when the remote terminal is provided at the position a-1 in a conventional example shown in FIG. 1, the remote terminal 2 in the present invention is away from the photographing optical axis thus reducing the above-mentioned problem. Additionally, since the remote terminal is attached at the angle $\theta$ as shown in FIG. 3, the problem of the remote wire entering into the picture is further reduced.

Figure 4:
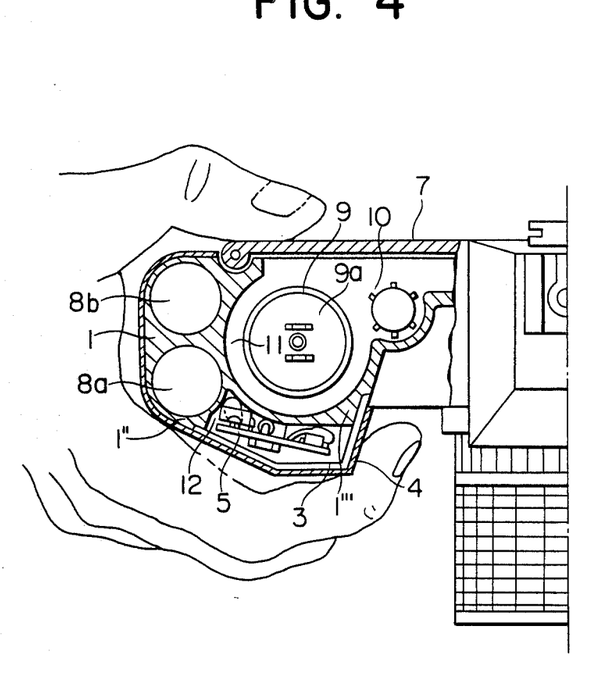
FIG. 4 is a cross-sectional view of other important portions of FIG. 2.

The motor 9a and the power source batteries 8 are positioned as close as possible to each other in this embodiment for reducing a power loss between the film wind up motor and the power source to the lowest possible level. Towards that end, as shown in FIG. 4, the battery chambers 8a and 8b are provided adjacent and parallel to the spool chamber 11, thereby generating the recess 12 between the cylindrical plane shape walls 1" and 1''' of the camera body forming the battery chamber 8a at the mount side and the spool chamber 11 respectively. The recess 12 and a space provided by the grip spacer 3 forming a portion of a grip part facilitating the holding of a camera are utilized to house the DC/DC converter 5 within the space. The converter is attached to the camera body 1 with bolts.

Such positioning of the DC/DC converter 5 not only eliminates the necessity to secure an extra space, but also reduces a resistance between an input terminal of the DC/DC converter 5 and the power source since the DC/DC converter 5 is positioned adjacent to the power source batteries 8. Thus the input terminal of the DC/DC converter 5 and the power source can be connected with a minimum distance therebetween, reducing the loss of the input voltage into the DC/DC converter 5 to a minimum level and enhancing the of efficiency of the DC/DC converter 5. Also, as the DC/DC converter 5 changes over from direct current to alternating current as mentioned above, an oscillation is made by a transistor, etc. Therefore, the voltage variation takes place in synchronism with the oscillation of the DC/DC converter corresponding to a resistance generated between the input terminal of the DC/DC converter 5 and the power source terminal. If the power source is used for a control IC of the camera an erroneous operation will occur. Therefore, a known type of electric filter has been heretofore used in order to stabilize the power source voltage for preventing the same. However, the value of the resistance can be minimized in this embodiment, thus eliminating the necessity of providing the above-mentioned electric filter.

Further, positioning of the DC/DC converter 5 within the grip part as in this embodiment means that it is physically position apart from the other electric circuit elements 62 and 64. Therefore, the electric circuit elements 62 and 64 will receive little influence of induced noises generated by the DC/DC converter 5 itself. When the DC/DC converter 5 is to be completely shielded electrically, the above object can be simply achieved, for example, by applying a known type of conductive coating or shielding conductive tape on the walls 1" and 1''' of the camera body forming a portion of the spool chamber 11 or by forming the camera body and the grip spacer with conductive type plastic materials.

As shown in this embodiment, the CPU 62, I/O interface LSI 64, etc. as the main circuit effecting functional control of the camera are positioned on an upper plane of the pentagonal prism 54. Batteries 8 are placed at the end plane position at the spool 9 side of the camera body 1. The DC/DC converter 5 is positioned near the output side of the batteries 8, thus reducing the connecting distance between the batteries 8 and the DC/DC converter 5. Accordingly, the resistance in this connection is reduced, and other various advantages as mentioned above are obtained.

Figure 7:
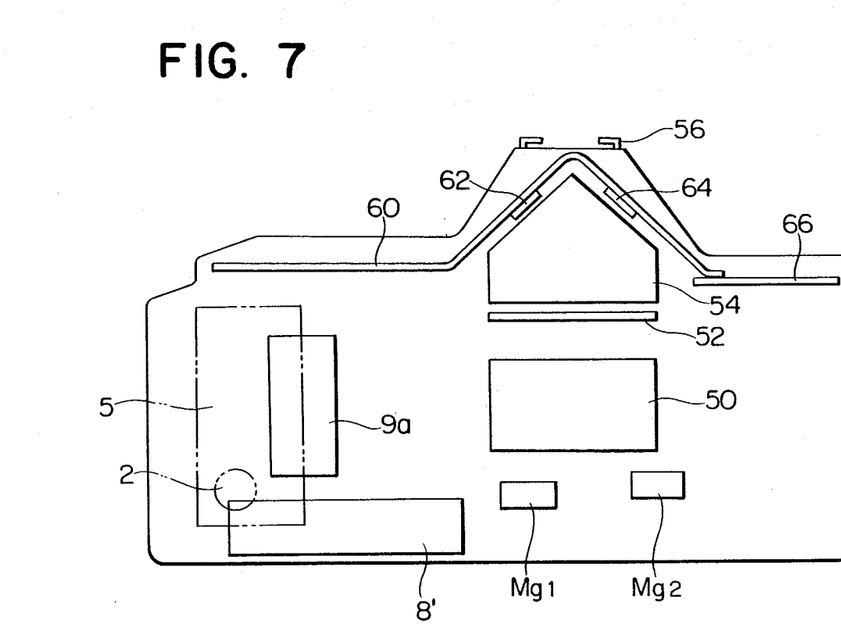
FIG. 7 is a front elevation showing an internal lay-out of a single lens reflex camera as a second embodiment of the present invention.

A second embodiment of the present invention will be described with reference to FIG. 7 and FIG. 8.

The difference of this second embodiment from the first embodiment is that batteries 8' are placed at a position in the bottom plane of the camera body 1. That is, the batteries 8' in the second embodiment are placed at the bottom plane position of the camera body 1, and the outputs of the batteries 8' are provided at the spool 9 side that is the grip side, wherein the outputs are connected to the DC/DC converter 5 with lead wire. Since the other arrangements are the same as those in the above-mentioned first embodiment, the same reference numerals are used correspondingly and a description thereof will be omitted.

While this second embodiment changes the position at which the batteries 8' are placed, similar effects as those in the first embodiment are obtained because the remote terminal 2 and the DC/DC converter 5 are positioned within the grip and the DC/DC converter 5 and the output terminals of the batteries 8' are placed close to each other.

Figure 8:
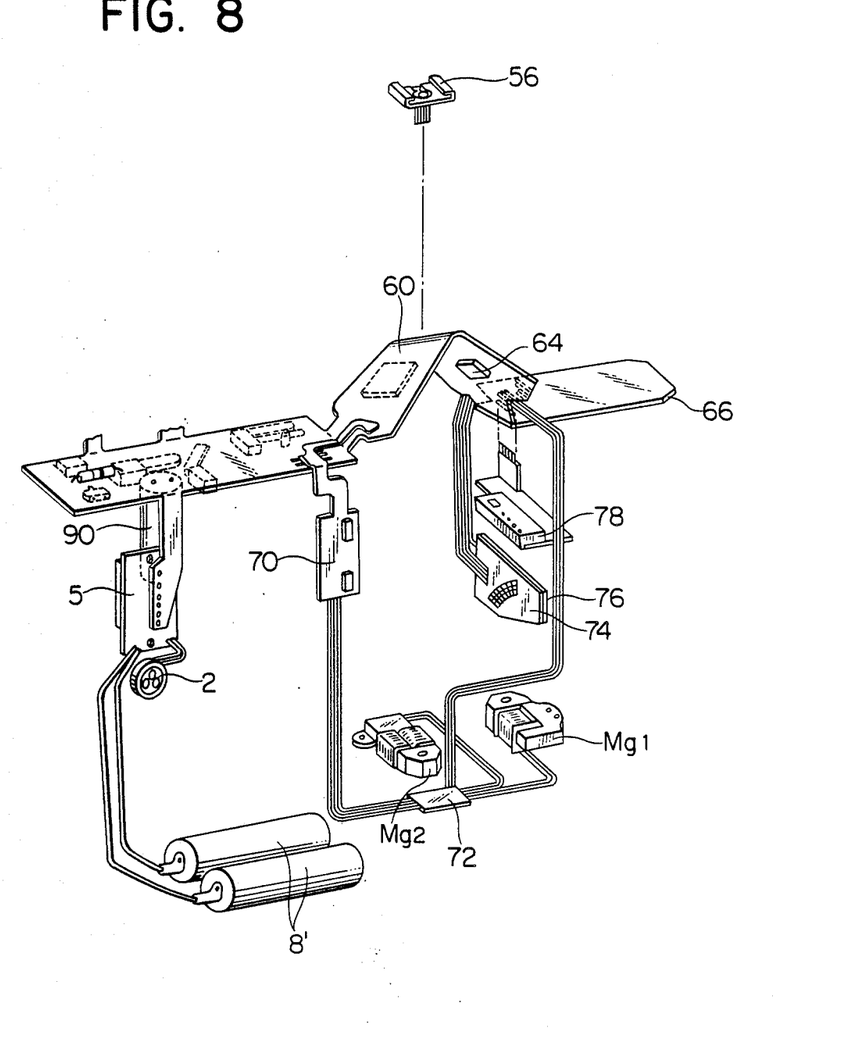
FIG. 8 is an oblique view of an arrangement of each component showing an internal lay-out of the single lens reflex camera shown in FIG. 7.

In the above-mentioned first and second embodiments, FIG. 6 and FIG. 8, oblique views for arrangement of each component showing an internal lay out of a single lens reflex camera, depict the connecting wires (lead wires, etc.) between each component as longer than their actual lengths to facilitate understanding of the positional relationship of each component.

As has been described above, the present invention houses circuit elements, particularly a remote terminal and a DC/DC converter, within the space of a grip which protrudes from the front plane of a camera body, thus achieving a reduction in size of the camera.

Also, in the embodiments of the present invention, because the DC/DC converter is placed at a neighboring position to the output terminals of the batteries, connecting wires between the batteries and the DC/DC converter are made of a short length. Thus, a resistance in the connecting wires is reduced, a loss of the input voltage into the DC/DC converter is minimized and the efficiency of this arrangement is enhanced.

Further, in the embodiments of the present invention, the main circuit elements of the camera and the DC/DC converter are placed at different positions from each other. Additionally, the output terminals of the batteries are placed close to the DC/DC converter. Therefore, the influence of undesirable noises generated by the oscillation of the DC/DC converter is not imparted to the main circuit elements of the camera, in addition to the above-mentioned effects.

What is claimed is:

1. Positioning and structure of circuit elements in a camera, comprising:
   (a) a grip protruding from a front plane of a camera body; and
   (b) a booster circuit arrangement positioned within said grip and within the protruding space of said grip formed at the front plane of the camera body.

2. Positioning and structure of circuit elements in a camera according to claim 1, further comprising:
   a main circuit arrangement for the camera housed at a position different from that of said booster circuit arrangement.

3. Positioning and structure of circuit elements in a camera according to claim 1, further comprising:
   a power source battery positioned at said grip side of the camera.

4. Positioning and structure of circuit elements in a camera according to claim 2, further comprising:
   a power source battery positioned at said grip side of the camera.

5. Positioning and structure of circuit elements in a camera according to claim 1, wherein said grip is positioned at a spool side of the camera.

6. Positioning and structure of circuit elements in a camera according to claim 1, wherein a DC/DC converter is used as said booster circuit.

7. Positioning and structure of circuit elements in a camera according to claim 1, wherein the camera is a single lens reflex camera.

8. Positioning and structure of circuit elements in a camera, comprising:
   (a) a spool positioned within a camera body;
   (b) a grip protruding from a front plane of the camera body, said grip being positioned at said spool side of the camera body; and
   (c) a booster circuit arrangement positioned within said grip and within a space arranged in front of said spool.

9. A camera body, comprising:
   (a) a grip protruding from a front plane of the camera body; and
   (b) a booster circuit arrangement positioned within said grip and within the protruding space of said grip formed at the front plane of the camera body.

10. A camera body according to claim 9, further comprising a main circuit arrangement for the camera housing at a position different from that of said booster circuit arrangement.

11. A camera body according to claim 10, further comprising a power source battery positioned at said grip side of the camera body.

12. A camera body according to claim 9, further comprising a power source battery positioned at said grip side of the camera body.

13. A camera body according to claim 9, wherein said grip is positioned at a spool side of the camera body.

14. A camera body according to claim 9, wherein a DC/DC converter is used as said booster circuit.

15. A camera body according to claim 9, wherein the camera body is a single lens reflex camera.

16. A camera body comprising:
   (a) a spool positioned within the camera body;
   (b) a grip protruding from a front plane of the camera body, said grip being positioned at said spool side of the camera body; and
   (c) a booster circuit arrangement positioned within said grip and within a space arrangement in front of said spool.

* * * * *